Oct. 20, 1931.  G. B. SCARLETT  1,828,684
COLLAPSIBLE TRUCK
Filed Nov. 11, 1929  2 Sheets-Sheet 1
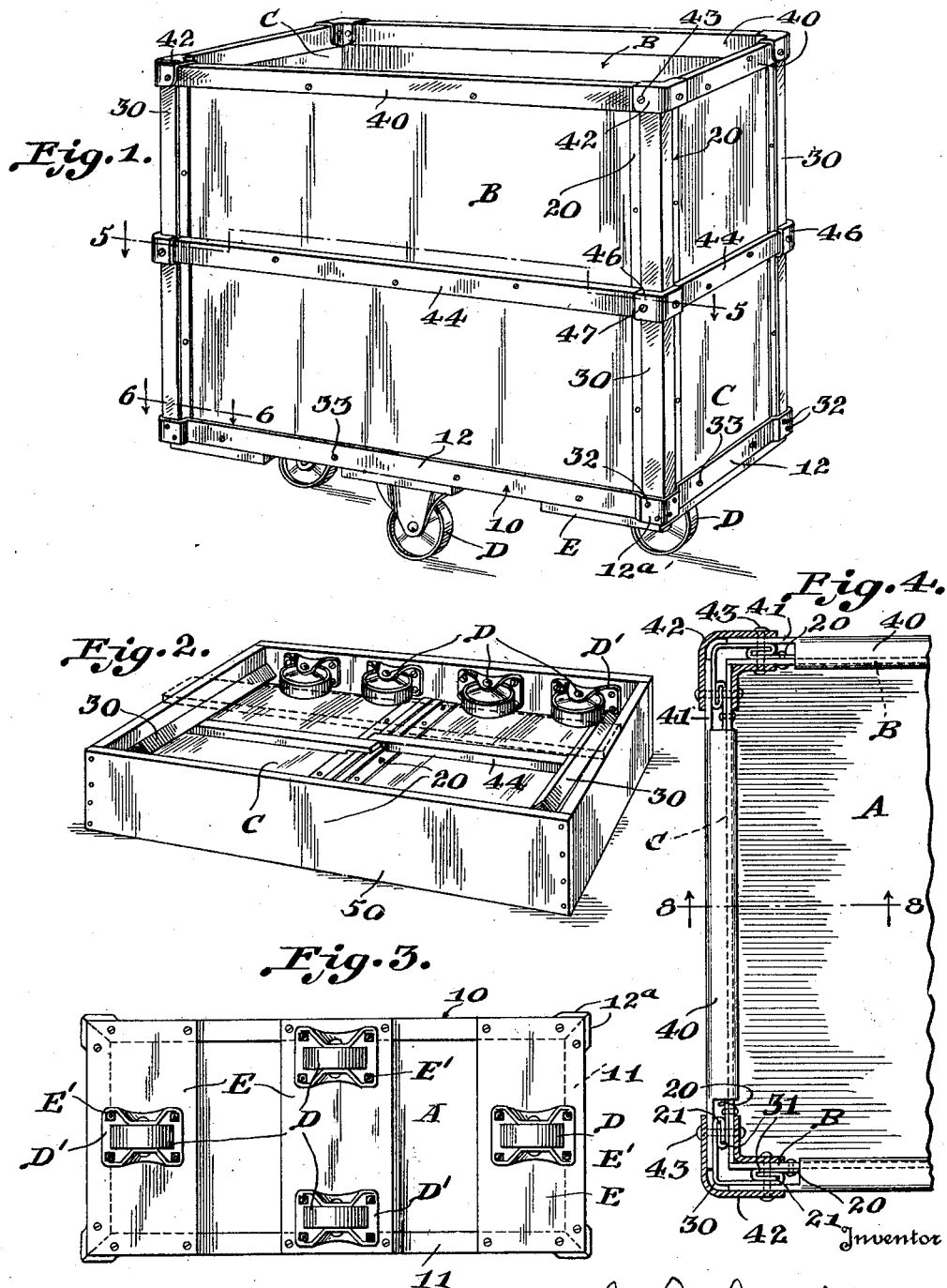

Oct. 20, 1931.  G. B. SCARLETT  1,828,684
COLLAPSIBLE TRUCK
Filed Nov. 11, 1929   2 Sheets-Sheet 2
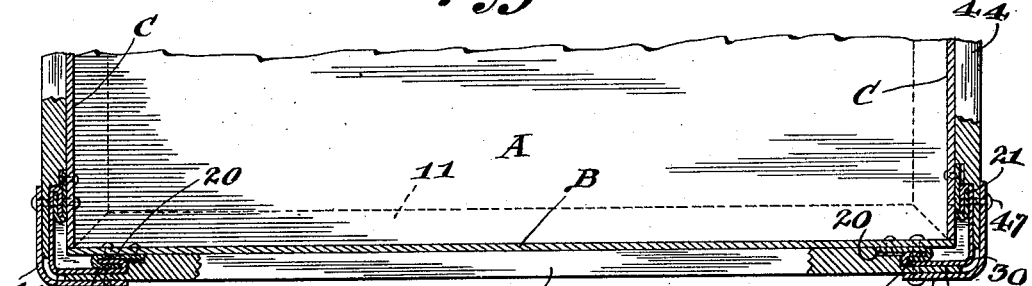
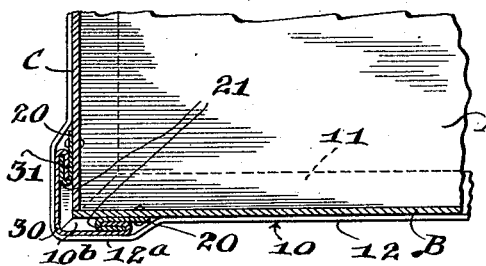
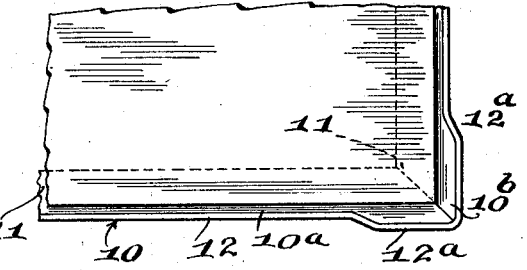
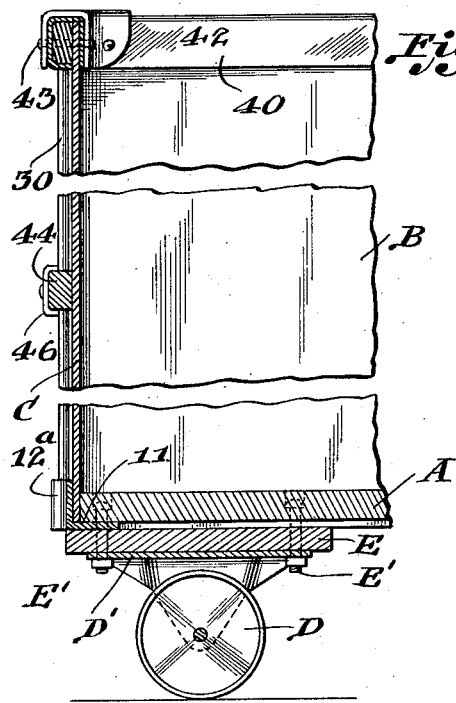
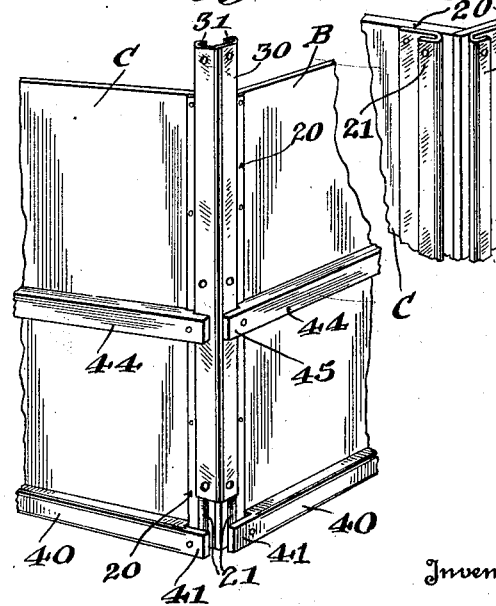

Patented Oct. 20, 1931

1,828,684

UNITED STATES PATENT OFFICE

GEORGE B. SCARLETT, OF KENNETT SQUARE, PENNSYLVANIA, ASSIGNOR TO FIBRE SPECIALTY MANUFACTURING COMPANY, OF KENNETT SQUARE, PENNSYLVANIA, A CORPORATION OF PENNSYLVANIA

COLLAPSIBLE TRUCK

Application filed November 11, 1929. Serial No. 406,387.

This invention relates to certain improvements in collapsible trucks; and the nature and objects of the invention will be readily recognized and understood by those skilled in the arts involved in the light of the following explanation and detailed description of the accompanying drawings illustrating what I at present consider to be the preferred embodiments or mechanical expressions of my invention from among various other forms, arrangements, combinations and constructions of which the invention is capable within the spirit and the scope thereof.

The general types of trucks to which the present invention is particularly directed and with which it mainly deals, are the so-called "mill" types of truck widely used and employed in factories, mills, warehouses, stores, and such like places, for carrying, transporting and moving merchandise and materials from point to point therein. Such types of trucks are generally wheeled and are manually pushed and propelled, and guided from place to place, usually under restricted space conditions so that they are subjected to considerable wear and tear and general hard usage in operation, arising especially from the continuous blows, collisions and other damaging contacts and forces which they meet with in use. Hence, as essential requirements, these types of truck must be of a strong and durable design and construction to stand up under the severe conditions of use, yet must be of such a size and weight that they can be readily propelled and easily maneuvered, and must not be of a high or prohibitive cost.

A serious difficulty and problem encountered in the manufacture and marketing of such trucks, as well as in their operation and maintenance by the user thereof, arises from the more or less bulky and space occupying nature and character of these trucks. The assembled trucks are of such a size and bulk and occupy such space, that the cost of shipping and transporting is very high, augmented by the further fact that the assembled trucks receive a classification for shipping purposes which brings them within the higher tariff rates, so that the costs of the trucks to the user is accordingly increased. On the other hand, because of the shipping costs, the market of the manufacturer is seriously restricted and limited, because of the prohibitive shipping and transportation costs beyond certain distances from the point of manufacture. Also, the cost of properly packing the assembled trucks for shipping, is a cost increasing item to the user. From the standpoint of the user and aside from the shipping costs, the assembled trucks at their points of use and when idle or stored, occupy such a space, particularly where large numbers are required, as to become a serious and costly item of waste space to the user.

It is a general object of this invention to practically eliminate and materially reduce the foregoing and other difficulties and problems, through the provision of a design, construction and arrangement for trucks of the types referred to, by which such trucks can be collapsed or knocked down and packed for shipment in collapsed condition to form a minimum size, compact and durable package of a character to receive the benefit of a lower range of transportation charges and which can be shipped at materially reduced cost as compared to the assembled trucks; and by which a collapsed truck can be readily, quickly assembled and set-up by unskilled labor without the necessity of special tools or apparatus, or an assembled truck can be quickly collapsed and knocked down into a minimum space occupying relation for storage purposes.

A further object of the invention is to provide a design and construction of collapsible or knock-down truck, which provides the necessary strength and rigidity in an assembled truck to meet the demands of service, yet in which a minimum of parts is required with a desired low weight maintained for the truck.

Another object of the invention is to provide a construction of collapsible or knock-down truck, in which the sides and ends of the truck are formed for slidable interlocking engagement to form a rigid truck body, and in which the truck bottom is formed by a unitary structure for receiving and onto which the assembled sides and ends are detachably secured and attached to complete the assembled truck, all with a minimum of structure and a maximum strength and rigidity in truck forming assembled position, and capable of being quickly knocked down in a minimum of time by a small number of operations, from assembled position to collapsed, minimum space occupying condition.

With the foregoing general objects and results in view, as well as certain others that will be readily recognized from the following explanation, the invention consists in certain novel features in construction and in combinations and arrangements of parts, as will be more fully and particularly referred to and specified hereinafter.

Referring to the accompanying drawings in which similar reference characters refer to corresponding parts throughout the several figures thereof:

Fig. 1 is a perspective view of a collapsible truck embodying the several features of the invention, in assembled truck forming position.

Fig. 2 is a perspective view of the shipping package formed by and with the truck in collapsed or knocked down condition.

Fig. 3 is a plan view of the under side of the truck bottom.

Fig. 4 is a fragmentary view in top plan of one end of the assembled truck, with the corners shown in horizontal section to bring out the interlocking, sliding connections between and rigidly joining the end wall and opposite side walls together.

Fig. 5 is a horizontal section taken on the line 5—5 of Fig. 1.

Fig. 6 is a horizontal section through the lower end of a corner of the truck taken on the line 6—6, of Fig. 1.

Fig. 7 is a fragmentary view in top plan of a corner of the truck bottom unit, showing the corner formation of the bottom frame.

Fig. 8 is a vertical section through one end of the truck taken on the line 8—8, of Fig. 4.

Fig. 9 is a perspective view of the adjoining ends of a truck side wall and end wall, with the sliding and interlocking truck corner post or member shown as being slid into assembled position thereon rigidly locking the wall ends together.

Fig. 10 is a fragmentary view of the upper end portion of Fig. 9, with the corner post or member removed, and showing the corner post engaging and interlocking flange members carried by the walls.

I have selected and illustrated and described herein, purely by way of example and not of limitation, a form of "mill" truck of the wheeled and manually propelled and guided type, in which the principles and various features of the invention are embodied and incorporated. The selected form of truck and the particular mechanical expressions which the various features of the invention happen to take therein, are employed solely for the purpose of explaining and bringing to light the principles and the several features of the invention to enable those skilled in the art to comprehend and clearly understand the same. The invention is capable of embodiment in various other forms, not only of "mill" trucks, but of various types of trucks or vehicles generally, and in its broadest aspects contemplates and includes application to and embodiment in "containers" whether of the wheeled or mobile type or otherwise, where it is found desirable to render such a "container" collapsible. Obviously, the specific forms and constructions called for to adapt the invention to various types of trucks and/or "containers", will vary in accordance with the particular needs and requirements of such types, respectively, and it is not intended or desired to restrict or confine the invention to any of such specific forms and constructions.

In the illustrated example, referring now to the accompanying drawings, the selected form of "mill" truck includes a bottom A, which in this instance is formed of wood, although not so limited; the opposite side walls B and opposite end walls C, extending upwardly from and around the bottom A, and joined and connected at their adjacent and abutting ends, respectively, to form the open top truck body; and the wheel or caster units D at the under side of bottom A and upon which the truck rests and on which it can be pushed or propelled from place to place. The truck side walls B and end walls C are formed in the present example of truck, from sheet vulcanized fibre, so-called, which is of relatively light weight, yet which has the requisite strength and toughness to meet the requirements of the truck in service. Any suitable bracing and reinforcing can be employed for the walls B and C, as will be described here inafter, or if desired the sheet vulcanized fibre can be covered with any suitable sheet metal, such as relatively thin sheet steel. Further, the truck side and end walls can, if preferred, be formed from any other material suited or adapted to the purpose, and it is not desired to in any way limit the invention to the character of material shown in the example hereof.

In accordance with the principles of the invention, the truck is collapsible and can be knocked-down or disassembled, by detaching and disconnecting the side walls B and end walls C from the truck bottom A, and from each other, so that the truck is then separated into a bottom unit, and separate side and end wall units, which can be placed together into a compact, relatively small space occupying group for packaging for shipment or storage, as will be more fully described and explained hereinafter.

In the mechanical expression of the example hereof for carrying out the invention, the truck bottom A is provided with a metal angle frame 10, rectangular in outline, and extending completely around the bottom A, with the horizontal flange 11 of the frame extending under and secured at the lower or under side of the bottom, and the vertical flange 12 thereof spaced outwardly from the edge of the bottom A to form an open top groove or slot 10a (see Fig. 7) extending completely around the bottom A between the bottom edge and the frame vertical flange 12. This vertical flange 12 of the bottom frame 10, in this instance, extends a distance above the top or upper surface of bottom A, although the invention is not so limited (see Fig. 8). For a purpose appearing hereinafter, a portion 12a of the vertical flange 12 at and around each corner of the truck bottom A, is bent or offset outwardly from the general plane of the flange to increase the space between the flange and the adjacent edge and corner of the bottom A and provide an enlargement of the slot or groove 10a at and a distance along each side from the corner to form a socket 10b at and around each corner of the truck bottom A. (See Fig. 7 in particular.)

The angle frame 10 is secured in position on and around the truck bottom A by the series of transverse wheel mounting and carrying battens E (see Figs. 3 and 8), which in the present example are three in number, although not so limited, and are secured transversely across the under side of bottom A over the frame flange 11, at opposite ends and at an intermediate point, respectively, of the truck bottom. The wheel or caster units D are secured and mounted on the battens E, by the bolts or the like E' which extend down through the truck bottom A, battens E, and base plates D' of the units D, with certain of these bolts E' located and extended downwardly through the frame horizontal flange 11, as will be clear by reference to Figs. 3 and 8 of the drawings. The bottom frame 10 is thus secured in position on and attached to the truck bottom A by the battens E and bolts E'. The bolts E' are more or less permanently mounted in and through bottom A with their upper headed ends preferably countersunk in the bottom A and with their lower ends extended below the battens E to receive removable wheel unit fastening nuts, so that the wheel units D can be removed from the truck bottom unit when desired in collapsing or knocking down the truck, as will be readily apparent from the accompanying drawings.

The truck body formed by the side walls B and end walls C, is built-up and detachably secured on and to the truck bottom unit A, the walls B and C being collapsibly secured together and assembled. Each of the walls B and C, is provided with a flanged member 20 riveted or otherwise suitably secured to the outer side thereof in vertical position thereon along, adjacent, and parallel to each end edge of the wall. Referring now to Figs. 9 and 10 of the drawings in particular, each of the wall flanged members 20, is formed from a suitable strip or length of metal or other suitable material, bent longitudinally along and adjacent one longitudinal edge portion, back upon itself to provide the longitudinally disposed flange 21 extending throughout the length of a member 20. The flanged member 20 at each end of a wall B or C, is mounted with the flange 21 adjacent the end edge of the wall but with the flange turned inwardly away from such wall edge.

The walls B and C are assembled together into truck body forming relation with the end walls C placed against and across and between the spaced side walls B, and are then detachably and collapsibly locked and secured together at each corner by the corner posts 30, respectively. Each corner post 30 is formed of an angle member having the longitudinal outer edge portions of its opposite flanges bent back upon themselves to form the inwardly extended, opposite side flanges 31 (see Fig. 9 in particular). A corner post member 30 is placed into position over each corner formed by the adjacent and abutting ends of the walls B and C, by inserting one end thereof over the ends of the adjacent spaced wall members 20 at opposite sides of a corner, with the corner post flanges over and received under the flanges 21 of wall members 20, and then sliding the corner post down over and onto the wall members 20 into position with flanges 31 and 21 interlocked and securing and rigidly locking the walls B and C together at the corners formed therebetween by the abutting ends of walls B and C, respectively.

With the walls B and C assembled and secured into truck body forming relation by the corner posts 30, the truck body thus formed is placed onto the truck bottom A, with the bottom edges of walls B and C fitting and received into the groove or slot 10a formed around the bottom between the bottom frame vertical flange 12 and the edge of bottom A, and the lower ends of the corner posts 30 received and fitted into the sockets 10b formed by the frame 10 at and around each corner of the bottom. The truck body formed by the rigidly connected walls B and C, is then detachably and rigidly secured into truck forming position on bottom A, by any suitable fastening elements, such for example as rivets 32 extended through the offset portions 12a of bottom frame flange 12 and the lower ends of the interlocked corner posts 30 and flanged members 20, and by suitable fastening elements 33 extended at spaced intervals through the bottom frame flange 12 and lower ends of walls B and C, between the corner posts 30, as will be clear by reference to Fig. 1 of the drawings in particular.

Preferably, the truck so formed is provided with a top or upper edge covering or band, formed by the strips 40 of wood or other suitable material, metal covered if desired or found expedient, secured over and along the upper edges of side walls B and end walls C, and each strip forming a part of its respective wall unit. The opposite ends of each strip or section 40 terminate at the flanged members 20, respectively, and are provided with the extensions 41 over, across and spaced outwardly from members 20, to permit free passage of the corner posts 30 thereunder in sliding such posts to and from position, (see Fig. 9). The adjacent ends of top band sections 40 are connected by the corner angles 42, which fit down over the upper edges of adjacent ends of walls B and C at the corners formed thereby, and are removably secured to and over the extensions 41 (see Fig. 4) by suitable fastening elements 43 removably extending through the corner angles 42, extensions 41, interlocked flanges 21 and 31, and the truck walls.

If desired, a center band for strengthening purposes is provided around the truck body, and can be formed by the intermediate strip 44 secured on the exterior of each side wall B and end wall C and having the opposite end extensions 45, over and spaced from the flanged members 20 to allow the corner posts 30 to pass thereunder. In assembled position of the truck, corner angles 46 are removably secured over and joining the adjacent ends of these strips 44 formed by the extensions 45, and are fastened in position by the removable fastening elements 47.

With the foregoing construction, the assembled truck of Fig. 1, presents the desired relative light weight but with the requisite strength and rigidity to withstand the conditions to which subjected in service. The truck can be quickly and easily collapsed or knocked-down by removing the corner pieces or angles 42 and 46; removing the lower end fastening elements 32 to release the corner posts, and the elements 33 to release the lower ends of walls B and C from bottom frame 10; and then lifting the side walls B and C from bottom A in connected truck body forming relation, after which the corner posts can be forced and slid outwardly and removed from interlocking engagement with the wall flanged members 20, thus detaching the walls B and C into separate units. Wheel or caster units D can then be removed from the truck bottom A, and the collapsed truck is ready for grouping into a small minimum space occupying, compact package or assembly.

In Fig. 2 of the drawings, the collapsed truck is shown formed into a package for shipment or storage. A relatively shallow box or crate 50 is provided into which the bottom unit A, and then the side walls B and C and detached corner posts 30 are placed. Finally, the removed wheel units D are removably secured by their base plates D' on the interior of a side wall of box 50, in position extending over an confining walls B and C into position in the box. The box or crate 50 can then be closed by a suitable cover as indicated in Fig. 2 by dotted lines, and the collapsed and packaged truck is ready for shipment. In this manner, the truck, so packaged can be shipped at relatively small cost, thus lowering the cost to the user, as well as increasing the range of possible shipment and consequently enlarging the market practically possible to the manufacturer. The package formed by the collapsed truck and the crate or box in which arranged is of relatively low cost, yet is durable in shipment and reduces possibility of damage to parts of the truck to a minimum. In collapsed form the truck can be stored in a small space, and where large numbers of trucks are employed by a user, or a manufacturer keeps a large stock stored, a material saving in space is obtained as compared to that required for the trucks if assembled.

The truck can be as readily set up and assembled from collapsed position, by mounting the wheel units D on the truck bottom; assembling the sides and ends B and C and locking them into truck body position by inserting the corner posts 30 into interlocking position with the wall members 20; and then placing the assembled walls in position on the truck bottom A in the groove or slot 10a formed by the bottom frame 10. The assembly is completed by detachably securing the walls B and C with corner posts 30 into position on the bottom, with the fastening elements 32 and 33, and attaching the corner angles 42 and 46 to complete the top band or rim and center band of the truck body.

While the invention is here disclosed and described as applied to and embodied in a truck or mobile type of container, it is to be understood that the invention is equally applicable to "containers" generally and the invention as set forth by the appended claims is to be so construed and interpreted.

It is also evident that various changes, modifications, variations, substitutions, eliminations and additions might be resorted to without departing from the spirit and scope of my invention, and hence I do not wish to limit myself to the exact and specific disclosures hereof.

Desiring to protect my invention in the broadest manner legally possible, what I claim, is:

1. In a collapsible truck, a bottom forming unit, opposite side and end walls detachably mounted on, secured to and supported by said bottom unit, and corner members slidably and removably engaged with and locking said side and end walls together at the adjacent corner forming ends of said walls.

2. In a collapsible truck, a bottom unit including a frame extending around said unit and forming an open top groove therearound, truck supporting members removably mounted on the under side of said bottom unit, and truck side and end walls detachably secured on said bottom unit with the lower ends of said walls received and seated in said groove.

3. In a collapsible truck, a bottom unit, truck supporting members removably attached to the under side of said unit, opposite side and end walls detachably mounted on said bottom unit, corner members slidably and removably engaged with and detachably securing adjacent ends of said walls together into body forming relation, and the lower ends of said corner members removably attached to the bottom unit.

4. In a collapsible truck, a bottom forming unit providing a bottom wall for the truck body, opposite side and end wall units detachably secured on said bottom unit and providing with the bottom unit an open top truck body, each of said wall units provided with a vertically disposed inwardly turned flange along and adjacent each vertical end edge thereof, respectively, and vertical corner posts removably fitted over and interlocking with the vertical flanges at adjacent ends of said wall units, respectively, to detachably connect and secure the wall units in truck body forming position, said corner posts vertically slidable from interlocking position to detach the side and end walls for removal from the bottom unit to collapse the truck.

5. In a collapsible truck, a bottom forming unit providing a bottom wall for the truck body, opposite side and end wall units each detachably secured to and supported on said bottom unit in vertically disposed body forming position extending upwardly from the bottom unit with their adjacent ends abutting, each wall unit provided at each end thereof with a vertically disposed and inwardly turned flange on the exterior of the unit adjacent the end vertical edge thereof, respectively, and corner posts each formed of an angle member having its opposite walls formed to provide longitudinally disposed inwardly turned and opposite flanges, the said corner posts slidably engaged over the adjacent but spaced flanges at each corner formed by the adjacent wall ends, respectively, with the corner post flanges interlocking with said wall flanges, respectively, to connect and secure the wall units in body forming position, and said corner posts vertically slidable and completely removable from position connecting the wall units for detachment of the units to collapse the truck.

6. In a collapsible truck, a truck bottom unit, including a bottom frame extending around said unit and forming an open top groove therearound, body forming opposite side and end wall members received and detachably secured at their lower ends in said groove, and wheel mounting members secured transversely across the under side of said bottom unit and securing and binding the said frame to the bottom unit.

7. In a collapsible truck, a truck bottom unit including a bottom frame extending around the exterior of and forming an open top groove around said bottom unit with the groove enlarged at and around each corner to provide corner sockets, body forming opposite side and end walls arranged in truck body forming position on said bottom unit with their lower ends removably received in said groove, and vertical corner posts detachably connecting the adjacent corner forming ends of said walls together to maintain the walls in position, the lower ends of said corner posts received and detachably secured in said corner sockets formed in the bottom unit groove.

8. In a collapsible truck, a bottom unit including an angle frame disposed around the exterior of the bottom with its horizontal flange disposed thereunder and its vertical flange spaced outwardly from the edge of the bottom to form an open top groove around the bottom, wheel mounting battens secured transversely across the under side of the bottom over the frame horizontal flange and securing the frame in position, and truck body forming side and end walls detachably secured on said bottom unit with their lower ends seated and received in said open top groove.

9. In a collapsible truck of the "mill" type, a bottom forming unit, truck supporting wheel members detachably mounted on the under side of said bottom unit, separate opposite side and end wall units detachably mounted and secured at their lower ends to said bottom unit in upwardly extending open-top truck body forming position therearound, and members detachably and rigidly connecting the adjacent wall unit ends, respectively, to rigidly secure the wall units in body forming position, said wall unit end connecting members removable from the wall units to disconnect such units for collapsing the truck.

10. In a collapsible truck of the "mill" type, a bottom forming unit, separate opposite side and end wall units detachably mounted at their lower ends to said bottom unit in upwardly extending open-top truck body forming position therearound, vertical corner members detachably and rigidly connecting the adjacent wall unit ends, respectively, to secure the wall units in body forming position, said corner members detachably secured at their lower ends to said bottom unit, and a top band or rim secured on and around the upper ends of said wall units, said band comprising separate sections secured to each wall unit, respectively, disposed in the same horizontal plane with the units in connected position, and corner members detachably secured over and connecting adjacent ends, respectively, of said band sections.

11. In a collapsible truck of the "mill" type, a truck bottom forming unit, separate opposite side and end forming wall units detachably mounted at their lower ends to said bottom unit in upwardly extending open-top truck body forming position, corner posts slidably fitted over and interlocking with the adjacent wall units ends for rigidly removably connecting and securing said wall units together in body forming position, and a reinforcing band extending horizontally around the truck body formed by said wall units, said band comprising a separate section secured to each wall unit and undercut at its opposite ends to extend over and spaced from the adjacent corner posts, respectively, for free insertion and removal of said posts, and corner members detachably connecting and bridging the adjacent ends, respectively, of said band sections.

12. In a collapsible truck, a bottom unit forming a truck body bottom wall or floor, separate opposite side and end wall units detachably secured at their lower ends on and supported by said bottom unit in body forming position extending therefrom and therearound, and corner posts slidably fitting over and engaging and interlocking with the adjacent wall unit ends, respectively, for rigidly removably connecting and joining said separate wall units together in body forming position, the said corner posts detachably secured at their lower ends to the bottom unit and readily slidably removable when detached from said bottom unit to release and detach said separate wall units.

13. In a collapsible truck, a truck bottom unit, including a bottom frame extending around said unit and forming an open top groove therearound, body forming opposite side and end wall members removably received and mounted at their lower ends in said groove, vertical corner post members slidably and removably engaged over and connecting adjacent ends of the side and end wall members, respectively, said corner post members extending at their lower ends into the bottom unit groove and detachably secured to the bottom unit, and wheel mounting members at the under side of the bottom unit over and across said bottom unit frame.

14. In a collapsible truck of the "mill" type, a truck bottom unit formed with an open top groove therearound, truck body forming opposite side and end walls removably seated at their lower ends in the bottom unit groove, and vertical corner posts removably engaged over and connecting adjacent ends of said side and end walls, respectively, the lower ends of said corner posts detachably secured to the bottom unit, said corner posts with their lower ends detached from the bottom unit vertically slidable from side and end wall engaged positions to completely removed positions for collapse of the truck.

15. In a collapsible truck, a truck bottom unit, separate opposite side and end forming wall units detachably mounted at their lower ends to said bottom unit in upwardly extending open-top truck body forming position thereon, corner posts slidably fitted over and engaging adjacent wall unit ends for removably connecting and securing said wall units together in body forming position, and a reinforcing band extending horizontally around the truck body, said band comprising a separate section attached to each wall unit and undercut at its opposite ends to extend over the adjacent corner posts, respectively, to provide for free insertion and removal of said posts to and from wall unit securing position.

Signed at Kennett Square, Pa., this 7th day of November, 1929.

GEORGE B. SCARLETT.